(12) United States Patent
Goulas et al.

(10) Patent No.: US 9,914,658 B2
(45) Date of Patent: Mar. 13, 2018

(54) FLOAT PROCESS FOR A GLASS-CERAMIC

(75) Inventors: Catherine Goulas, Paris (FR); Rémi Jacques, Estrees Saint Denis (FR); Gilles Querel, Worcester, MA (US)

(73) Assignee: EUROKERA, Jouarre (FR)

( * ) Notice: Subject to any disclaimer, the term of this patent is extended or adjusted under 35 U.S.C. 154(b) by 917 days.

(21) Appl. No.: 12/513,670

(22) PCT Filed: Nov. 5, 2007

(86) PCT No.: PCT/FR2007/052299
§ 371 (c)(1),
(2), (4) Date: Aug. 5, 2009

(87) PCT Pub. No.: WO2008/056080
PCT Pub. Date: May 15, 2008

(65) Prior Publication Data
US 2009/0314034 A1 Dec. 24, 2009

(30) Foreign Application Priority Data

Nov. 7, 2006 (FR) .................................. 06 54760

(51) Int. Cl.
*C03B 18/02* (2006.01)
*C03C 3/083* (2006.01)
*C03C 10/00* (2006.01)

(52) U.S. Cl.
CPC .............. *C03B 18/02* (2013.01); *C03C 3/083* (2013.01); *C03C 10/0027* (2013.01); *Y10T 428/26* (2015.01); *Y10T 428/265* (2015.01)

(58) Field of Classification Search
CPC ..... C03B 18/02; C03C 3/083; C03C 10/0027; Y10T 428/26; Y10T 428/265
USPC ............................ 65/90, 99.1, 99.2; 501/134
See application file for complete search history.

(56) References Cited

U.S. PATENT DOCUMENTS

| 3,954,432 | A | | 5/1976 | Hummel et al. |
| 4,305,745 | A | * | 12/1981 | Mouly ............................ 65/99.5 |
| 6,065,309 | A | * | 5/2000 | Cooper et al. ................. 65/99.2 |
| 6,096,670 | A | | 8/2000 | Lautenschlaeger et al. |
| 6,376,084 | B1 | | 4/2002 | Kishimoto et al. |
| 6,962,887 | B2 | * | 11/2005 | Heithoff .......................... 501/64 |
| 2002/0023463 | A1 | * | 2/2002 | Siebers et al. ................. 65/99.5 |
| 2003/0037569 | A1 | * | 2/2003 | Arbab et al. ...................... 65/22 |
| 2005/0250639 | A1 | * | 11/2005 | Siebers et al. .................. 501/68 |
| 2007/0015653 | A1 | * | 1/2007 | Lautenschlaeger et al. ... 501/68 |

FOREIGN PATENT DOCUMENTS

| DE | 10 2005 033 908 | 5/2006 |
| JP | 2001-354446 | 12/2001 |
| WO | WO 2005/073138 A1 | 8/2005 |

OTHER PUBLICATIONS

Japanese Office Action dated Aug. 28, 2012, in Patent Application No. 2009-535106 (with English-language translation only).

* cited by examiner

*Primary Examiner* — Michael H. Wilson
*Assistant Examiner* — Yana B Krinker
(74) *Attorney, Agent, or Firm* — Oblon, McClelland, Maier & Neustadt, L.L.P.

(57) ABSTRACT

The invention relates to a process for manufacturing a flat ribbon of precursor glass for a glass-ceramic, comprising the continuous floating of the molten glass on a bath of molten metal in a float chamber, said glass being poured in the molten state at a temperature above its devitrification onset temperature onto the molten metal upstream of the chamber, said glass progressively forming a ribbon that runs along said metal bath, the cooling rate of the glass being at least 18° C./min between, on the one hand, the moment when the glass is at the theoretical temperature for which the devitrification rate is a maximum and, on the other hand, the later moment when the glass is at the theoretical temperature at which the devitrification crystal growth rate becomes less than 1 micron per minute. The glass thus floated does not undergo any devitrification.

20 Claims, No Drawings

FLOAT PROCESS FOR A GLASS-CERAMIC

The present application is the U.S. counterpart of WO 2008/056030, the text of which is incorporated by reference and claims the priority of the French application No. 0654760 filed on Nov. 7, 2006, the text of which is incorporated by reference.

The invention relates to the manufacture of flat glass by the float process, said glass being a glass-ceramic precursor.

Glass-ceramics are materials rich in silica that comprise at least one crystalline phase and are obtained after a ceramization heat treatment starting with a precursor glass (or mother glass). Glass-ceramics have a very low linear thermal expansion coefficient, generally less than $15 \times 10^{-7}$ $K^{-1}$. A glass-ceramic may comprise at least 50% silica by weight. One important family of glass-ceramics is that comprising both $SiO_2$, $Al_2O_3$ and $Li_2O$, for which the ceramization treatment results in β-eucryptite or β-spodumene or β-quartz crystals.

These glass-ceramics, which are translucent or opaque, are particularly useful as cooktops or fire-resistant plates, and more generally in uses requiring a glass having a very low expansion coefficient. However, glass-ceramics have the drawback of having a high tendency to devitrify when hot, which usually results in many maintenance operations being carried out on the forming installations. This is because glass-ceramic plates or sheets are usually produced by rolling between metal rolls and any devitrification deposits damage the surface of said rolls. They therefore have to be periodically ground (even every 2 to 3 days), or even have to be replaced. Glass-ceramic forming installations are therefore usually designed to make maintenance operations easy to carry out, which means great ease of accessibility to the rolling rolls, even during manufacture. It is thus unthinkable for a person skilled in the art to form glass-ceramics in enormous installations in which the core remains inaccessible during operation, as is the case with float glass installations. This is because such installations measure several tens of meters or even several hundreds of meters in length by several meters in width, and the start-up and stop transition times are considerable. Such installations must therefore operate continuously and a stoppage for maintenance is catastrophic and unacceptable. Conventional installations for forming glass-ceramics by rolling between rolls do not moreover allow very wide sheets to be produced. The width is limited to less than 700 mm. However, there is a current need for wider plates. In addition, this rolling process does not allow very thin sheets to be produced, with a thickness of less than 3 mm.

It has actually been found that the float glass process for a glass-ceramic cannot be carried out as is usually done for a conventional glass of the soda-lime-silica type, by casting the glass at about 1050° C. This is because devitrification never fails to occur, especially in the zone where the glass is poured onto the metal float bath. It will be recalled that, in the manufacture of a ribbon of float glass for the production of flat glass sheets, molten glass is poured onto a bath of molten metal, generally tin or an alloy consisting predominantly of tin, on which it forms said continuous ribbon, which is progressively cooled and extracted using extractor rolls which convey it into an annealing furnace called a lehr. The zone covering the glass ribbon while it is running over the bath of molten metal is encumbered by heating systems and cooling systems that are designed to condition the temperature and more precisely the viscosity of the glass, so as to allow it to be pulled to the desired thickness and then to allow it to solidify.

To overcome the inopportune devitrification problem of a precursor glass for a glass-ceramic during the float process, WO 2005/073138 recommends eliminating dead spots in the float glass, especially by pouring molten metal thereinto, which requires special pipes to be installed for the molten metal.

U.S. Pat. No. 3,684,475 teaches the passage of a rolled glass strip over a metal bath. Here there is therefore no pouring of molten glass. Such rolling at these very high temperatures does not allow wide and/or thick glass sheets to be obtained.

US 2002/0023463 teaches a particular glass-ceramic composition that can be produced by the float process without surface crystallization. That document teaches in particular that a depletion in ZnO on the surface generates devitrification. The glass remains a long time floating (30 to 40 minutes), so that the cooling rate of the glass is less than 18° C./min.

As other documents, mention may be made of U.S. Pat. No. 3,539,320, U.S. Pat. No. 4,115,091, U.S. Pat. No. 3,718,450 and French patent application No. 05/54052.

It has now been discovered that it is possible to use a conventional float glass installation for floating a precursor glass for glass-ceramic, even if its composition is conventional. According to the invention, two conditions have to be met:

a) the glass is poured at a temperature above its devitrification onset temperature; and b) the cooling rate of the glass is at least 18° C./min between, on the one hand, the moment t1 when the glass is at the temperature for which the devitrification rate is a maximum and, on the other hand, the moment t2 (t2 coming after the moment t1, that is to say t2 follows t1) when the glass is at the temperature at which the devitrification crystal growth rate becomes less than 1 micron per minute.

Conditions a) and b) above involve devitrification parameters (temperature and crystal growth rate), although in fact no devitrification takes place thanks to the process according to the invention. This is the reason why it is also possible to speak of theoretical temperatures. In fact, it is recommended to determine these parameters beforehand, that is to say before carrying out the process according to the invention, by performing devitrification trials on specimens of the desired composition. Now, these parameters may vary depending on the composition of the glass. To determine them, glass specimens are placed in crucibles, which are heated to a temperature high enough so that no devitrification can occur (in general 1500° C. or even 1400° C. is sufficient), the specimens are left to cool down to a temperature T at which a hold time of time t is observed, and then they are rapidly cooled. By varying T and t, it is possible to determine the devitrification onset temperature and the devitrification rate. It is also possible to use DSC to determine the maximum devitrification temperatures and rates. The size of the crystals in the specimens are determined by visual observation in a binocular microscope. The moment t2 occurs after the moment t1.

To meet condition a), it is generally sufficient to heat the glass to at least 1380° C., preferably at least 1400° C. and even at least 1450° C., in order to cast it onto the molten metal upstream of the float chamber. The cast glass generally comes directly from the melting furnace, without solidifying between the furnace and the float chamber.

The cooling rate of the glass is at least 18° C./min between the moment t1 and the moment t2. This rate, between t1 and t2, is generally less than 48° C./min and may be less than 40° C./min, or even less than 30° C./min or even less than 28° C./min.

As in the case of an ordinary soda-lime-silica glass, a slightly reducing gaseous atmosphere is maintained in the float chamber, for example an $N_2/H_2$ mixture containing 1 to 12% hydrogen (in normal volume or Nl). The gaseous atmosphere is generally replenished in the float chamber at the rate of 3 to 250 times per hour.

In the float process for an ordinary soda-lime-silica glass, the metal bath is at about 1000° C. Within the context of the invention, it is generally necessary for the molten metal to be above 1150° C., even above 1200° C. and even above 1250° C., on the surface at the point of casting. Good results have been obtained with a temperature of 1250° C. measured at 3 cm below the surface of the molten metal at the point where the glass is cast. This means that the temperature is above that of the surface itself. As the glass flows towards the downstream end of the float chamber, it has a tendency to entrain metal with it towards the downstream end too. In the most conventional float glass process (prior art), the metal returns to the upstream end via a deeper current, this movement generally being termed a circulation loop. However, within the context of the present invention, knowing that it is necessary to comply with a minimum cooling rate of the glass during its travel through the chamber, it is recommended that the molten metal also drop in temperature from the upstream end towards the downstream end. This is why, instead of having a single circulation loop of the molten metal between the downstream end and the upstream end, it may be preferable to have at least two successive circulation loops along the path of the glass, thanks to a submerged dam in the molten metal in an intermediate zone of the bath. This dam may especially be made of molybdenum coated with a protective layer, for example alumina. Thus, it is possible to have a hotter circulation loop towards the upstream end and a cooler circulation loop towards the downstream end. It is also possible in the same way to form at least three successive circulation loops of molten metal. The variation in the temperature from the upstream end towards the downstream end is controlled by the heating elements placed above the glass over the entire length of the installation. The aim is in general, at the point where the glass separates from the metal (the most downstream glass/molten metal contact point) for the glass to have a temperature between 730 and 850° C. Preferably, the glass is cast upstream at a temperature such that the logarithm to the base 10 of its viscosity in poise ranges from 3.4 to 3.9. Preferably, at the point where the glass separates from the metal (the most downstream glass/molten metal contact point), the glass has a temperature such that the logarithm to the base 10 of its viscosity in poise ranges from 11 to 12.

In the conventional process for manufacturing flat glass-ceramic by rolling, the precursor glass generally contains arsenic in oxidized form as refining agent. The presence of arsenic in the precursor glass to be converted according to the invention is not recommended since the gaseous atmosphere of the float installation could then be laden with toxic gas. It is therefore recommended to use another refining agent, such as $SnO_2$. Unexpectedly, it has been observed that the $SnO_2$-enriched precursor glass converted into flat glass in accordance with the invention results in a glass-ceramic of improved hardness. The precursor glass may thus contain 0 to 0.5% $SnO_2$ by weight. The precursor glass preferably contains less than 100 ppm $As_2O_3$ by weight. The precursor glass may contain no antimony or may contain less than 100 ppm $Sb_2O_3$ by weight.

The precursor glass may contain no tin. In particular, this may be a glass whose composition is that claimed in French Patent Application No. 05/54052 (the content of which is included by reference), i.e. a glass having the following composition:

| | |
|---|---|
| $SiO_2$ | 52-75% by weight |
| $Al_2O_3$ | 18-27% by weight |
| $Li_2O$ | 2.5-5.5% by weight |
| $K_2O$ | 0-3% by weight |
| $Na_2O$ | 0-3% by weight |
| ZnO | 0-3.5% by weight |
| MgO | 0-3% by weight |
| CaO | 0-2.5% by weight |
| BaO | 0-3.5% by weight |
| SrO | 0-2% by weight |
| $TiO_2$ | 1.2-5.5% by weight |
| $ZrO_2$ | 0-3% by weight |
| $P_2O_5$ | 0-8% by weight. |

However, the precursor glass may contain tin in oxidized form, acting in particular as a refining agent. In general, the $SnO_2$ content will then range from 0.1 to 0.5% by weight. It has been observed that the face in contact with the metal is enriched with tin. During a trial, it has been observed in particular that the $SnO_2$ concentration increases over a depth of 150 nm, passing from 0.2% by weight at a thickness of less than 150 nm to 10% by weight on the surface. After the float process according to the invention, the glass has a surface gradient of $SnO_2$, the content of which decreases towards the core of the glass. It is estimated that, within the surface thickness of 150 nm, the $SnO_2$ concentration locally exceeds a concentration of at least 5% by weight, or even at least 8% by weight, but generally at most 12% by weight. The increase in surface strength, measured by indentation, on the glass-ceramic, which may be due to this enrichment, is illustrated by the examples below.

Two glass-ceramics of the same composition were compared, one being produced according to the invention and the other being produced by the conventional rolling process. These glass-ceramics both had, as overall composition:

| Ingredient | % by weight |
|---|---|
| Alumina $Al_2O_3$ | 19 |
| Arsenic oxide $As_2O_3$ | 0.01 |
| Barium oxide BaO | 0.8 |
| Lime CaO | 0.1 |
| Total iron expressed as $Fe_2O_3$ (including 0.006 of reducing iron FeO) | 0.033 |
| Potassium oxide $K_2O$ | 0.2 |
| Lithium oxide $Li_2O$ | 3.5 |
| Magnesia MgO | 1.2 |
| Sodium oxide $Na_2O$ | 0.2 |
| Metered silica $SiO_2$ | 68.65 |
| Tin oxide $SnO_2$ | 0.19 |
| Titanium oxide $TiO_2$ | 2.6 |
| Vanadium oxide $V_2O_5$ | 0.06 |
| Zinc oxide ZnO | 1.6 |
| Zirconium oxide $ZrO_2$ | 1.8 |

It has been found, from microindentation results (with a Vickers tip applied with various loads), within the context of determining the mechanical hardness, that the float glass-ceramics (after ceramization of the float glass followed by ageing for 1000 h at 725° C.) have a reduction in mechanical strength on the tin face (the face that was in contact with the tin bath) that is half that of the rolled glass-ceramic of the same chemical composition.

The glass may contain ZnO, generally with a content of up to 3.5% by weight. It has been observed that the process according to the invention reduces the surface content of ZnO, on the side in contact with the gaseous atmosphere (not that in contact with the metal bath). To give an example, a glass containing in the core (for example in the middle of the thickness of the glass) on average 2% ZnO by weight would see its concentration progressively reduced to 0% at the surface, whereas at more than 10 microns in depth the ZnO content is 2% by weight. Now, this surface depletion is not reflected in the lesser devitrification, contrary to the teaching of US 2002/0023463.

The precursor glass (and the glass-ceramic derived therefrom) may contain no colorant. This is because there is a need for transparent glass-ceramic, in particular for chimney inserts and fire-resistant doors. However, for many other applications, the glass-ceramic must be opaque in the visible range, but as transparent as possible with respect to infrared. For example for a cooktop, the glass-ceramic conceals from view the heating elements placed beneath it, but lets through as much heating radiation as possible for cooking (the heating resistance elements nevertheless become visible through the glass-ceramic plate when they are red).

When the aim is to obtain a colored glass-ceramic and/or one having a lower infrared transmission, at least one of the following colorants may be added to the glass composition:

| | |
|---|---|
| $Fe_2O_3$ | up to 1% and more generally 0.2 to 0.9% by weight; |
| NiO | up to 1% and more generally 0.2 to 0.9% by weight; |
| $Cr_2O_3$ | up to 1% and more generally 0.2 to 0.9% by weight; |
| CuO | up to 1% and more generally 0.2 to 0.9% by weight; |
| CoO | up to 1% and more generally 0.2 to 0.9% by weight; |
| $Mn_3O_4$ | up to 1% and more generally 0.2 to 0.9% by weight; |
| $V_2O_5$ | up to 1% and more generally 0.2 to 0.9% by weight; | and the total sum of the colorants not in general exceeding 2%.

$V_2O_5$ is a preferred colorant as it makes it possible to give the final glass-ceramic desired specific properties, especially for an application as cooktop. Apart from a black appearance in reflection and a reddish brown tint in transmission, which are appreciated from the aesthetic standpoint, $V_2O_5$ gives the glass-ceramic a low transmission in the visible and a high infrared (IR) transmission. The low transmission in the visible means that the user is not dazzled by the underlying heating elements, and the high infrared transmission makes visual detection of the heating element possible when it is in operation and makes it easier to control the cooking conditions.

The glass-ceramics containing a colorant have the drawback of seeing their color being slowly modified over time, this generally being due to a change in the degree of oxidation of the colorant. This undesirable ageing is reflected by a change in the coloration at the points that are heated most during use. Thus, in the case of cooktops, the repeated heating by the resistance elements, always at the same places, leads to the formation of visible marks that take the form of said resistance elements. In the case of the colorant $V_2O_5$, it is the slow change towards $V_3O_2$ that causes the formation of more pronounced marks. The ageing resistance may be tested by accelerated thermal treatments involving higher temperatures than would be involved by the envisaged use. A standard test consists of heating for 1000 hours at 725° C., after which the capability of the glass-ceramic to transmit IR is measured.

Unexpectedly, it has been found that, for the same composition, a flat glass-ceramic plate produced according to the present process ages much less rapidly than a glass-ceramic produced by the conventional forming process by rolling. Without this explanation being able to limit the scope of the present application, it seems that the slightly reducing atmosphere used during the float process may be the origin of this property. In fact, it has been found that the two faces of the plate had a darker layer than the core, the layer having been in contact with the atmosphere of the float chamber being markedly thicker. The invention also relates to a sheet of glass-ceramic precursor glass containing a multivalent colorant having, uniformly over at least one main face of said plate, a more reduced state on the surface than in the core, said main face having an area of least 100 cm$^2$, possibly greater than 200 cm$^2$ and even greater than 400 cm$^2$. In particular, the more reduced state goes from the surface down to a depth ranging from 100 to 300 μm. The invention also relates to a glass-ceramic plate containing a multivalent colorant having, uniformly over at least one main face of said plate, a more reduced state on the surface than in the core, said main face having an area of at least 100 cm$^2$, possibly greater than 200 cm$^2$ and even greater than 400 cm$^2$.

To give an example, in a trial with a glass-ceramic containing 0.7% $V_2O_5$, it has been observed that there is a darker layer of 120 μm thickness on the atmosphere face and a layer of 10 μm thickness on the tin face. It seems that the formation of this layer, uniformly over the entire surface, slows down the subsequent ageing. The examples of the table below illustrate this effect. The table compares the IR transmissions (in %, according to the EN410 standard for a 3 mm thickness) measured on plates of the same composition (the composition already given above) before and after the ageing test of 1000 h at 725° C.:

| | Before ageing | After ageing | % reduction |
|---|---|---|---|
| Rolled glass-ceramic | 73 | 66 | 9.6% |
| Float glass-ceramic (according to the invention) | 72.3 | 71.5 | 1.1% |

In the example according to the invention, the cooling rate between the moments t1 and t2 was 25° C./min.

The float process carried out on the glass according to the invention gives a glass that is not yet a glass-ceramic, but should be converted in an additional step well known to those skilled in the art. The particular structure of the glass-ceramic is produced by a specific heat treatment (called "ceramization") after the operation of forming the glass into a sheet/plate and even generally after the float glass ribbon has been cut longitudinally and transversely.

To give an example, for a glass-ceramic based on $SiO_2$—$Al_2O_3$—$Li_2O$, the ceramization treatment may generally be carried out as follows:
   a) the temperature is raised at a rate of 30 to 80° C./minute up to the nucleation range, generally lying close to the glass conversion range;
   b) the temperature passes through the nucleation range (670-800° C.) over 15 to 25 minutes;

c) the temperature is raised at a rate of 15 to 30° C./minute up to the ceramization hold temperature, generally between 900 and 1100° C.;

d) the ceramization hold temperature is maintained for a time of 10 to 25 minutes; and e) the plate is rapidly cooled down to the ambient temperature.

After the ceramization cycle, the glass plate contains the crystalline phase characteristic of the glass-ceramic structure.

After the ribbon (ceramized or not) has been cut, the plates obtained have two main surfaces (and an edge with 4 small surfaces), the area of which is greater than 100 cm$^2$ and generally greater than 1000 cm$^2$.

The invention claimed is:

1. A process for manufacturing a flat ribbon of precursor glass for a glass-ceramic, comprising the continuous floating of the molten glass on a bath of molten metal in a float chamber, said glass being poured in the molten state at a temperature above its devitrification onset temperature onto the molten metal upstream of the chamber, said glass progressively forming a ribbon that runs along said metal bath, the cooling rate of the glass being at least 18° C./min and less than 48° C./min between, on the one hand, the moment t1 when the glass is at the theoretical temperature for which the devitrification rate is a maximum and, on the other hand, the later moment t2 when the glass is at the theoretical temperature at which the devitrification crystal growth rate becomes less than 1 micron per minute.

2. The process as claimed in claim 1, wherein the cooling rate of the glass is at least 18° C. min and less than 40° C./min between t1 and t2.

3. The process as claimed claim 1, wherein the cooling rate of the glass is at least 18° C./min and less than 30° C./min between t1 and t2.

4. The process as claimed in claim 1, wherein the cooling rate of the glass is at least 18° C./min and less than 28° C./min between t1 and t2.

5. The process as claimed in claim 1, wherein the glass is heated to at least 1380° C. in order to be poured onto the molten metal.

6. The process as claimed in claim 1, wherein the glass is heated to at least 1400° C. in order to be poured onto the molten metal.

7. The process as claimed in claim 1, wherein a gaseous atmosphere comprising an N$_2$/H$_2$ mixture containing 1 to 12% hydrogen in normal volume is maintained in the float chamber.

8. The process as claimed in claim 1, wherein the metal bath is more than 1150° C. on the surface at the point where the glass is cast.

9. The process as claimed in claim 1, wherein the metal bath is more than 1250° C. on the surface at the point where the glass is cast.

10. The process as claimed in claim 1, wherein at the point downstream where the glass separates from the metal, the glass has a temperature ranging from 730 and 850° C.

11. The process as claimed in claim 1, wherein the glass is cast at a temperature such that the logarithm to the base 10 of its viscosity in poise ranges from 3.4 to 3.9.

12. The process as claimed in claim 1, wherein, at the point where the glass separates from the metal, the glass has a temperature such that the logarithm to the base of its viscosity in poise ranges from 11 to 12.

13. The process as claimed in claim 1, wherein the SnO$_2$ content of the glass ranges from 0.1 to 0.5% by weight.

14. The process as claimed in claim 1, wherein the molten glass is free of crystals and poured and cooled such that no devitrification occurs.

15. The process as claimed in claim 1, wherein the glass-ceramic precursor glass plate comprises SiO$_2$, Al$_2$O$_3$, and Li$_2$O.

16. The process as claimed in claim 1, wherein the glass-ceramic precursor glass plate comprises SiO$_2$, Al$_2$O$_3$, and Li$_2$O, wherein the cooling rate of the glass is at least 18°C./min and less than 28° C./min between t1 and t2, and wherein the glass is heated to at least 1380° C. in order to be poured onto the molten metal.

17. The process of claim 16, wherein the glass is heated to at least 1400° C. in order to be poured onto the molten metal, wherein the metal bath is more than 1150° C. on the surface at the point where the glass is cast, wherein the molten glass is free of crystals and poured and cooled such that no devitrification occurs, and wherein the glass-ceramic precursor glass plate comprises SiO$_2$, Al$_2$O$_3$, and Li$_2$O.

18. A glass-ceramic precursor glass plate that is free of crystals and which comprises SnO$_2$, the SnO$_2$ concentration locally reaching a concentration of at least 5% by weight within a thickness of 150 nm from the surface of a main face.

19. The plate as claimed in claim 18, wherein the SnO$_2$ concentration locally reaches a concentration of at least 8% by weight within a thickness of 150 nm from the surface of a main face.

20. The glass-ceramic precursor glass plate as claimed in claim 18, comprising SiO$_2$, Al$_2$O$_3$, and Li$_2$O.

* * * * *